United States Patent [19]

Hardin

[11] 4,245,549

[45] Jan. 20, 1981

[54] CONTROL DEVICE DIAPHRAGM STACK AND METHOD OF MAKING THE SAME

[75] Inventor: George T. Hardin, Knoxville, Tenn.

[73] Assignee: Robertshaw Controls Company, Richmond, Va.

[21] Appl. No.: 943,667

[22] Filed: Sep. 18, 1978

[51] Int. Cl.³ .............................................. F01B 19/02
[52] U.S. Cl. ......................................... 92/48; 29/454; 92/49; 92/97; 92/100
[58] Field of Search ................. 92/97, 48, 99, 39, 100, 92/49; 29/454; 403/364; 137/85; 73/716

[56] References Cited

U.S. PATENT DOCUMENTS

| 2,659,381 | 11/1953 | Seljos | 92/49 X |
| 3,150,675 | 9/1964 | Phillips | 92/97 X |
| 3,169,402 | 2/1965 | Baker | 137/85 X |
| 3,656,413 | 4/1972 | Eggstein | 92/99 X |
| 3,703,741 | 11/1972 | Foster et al. | 403/364 X |
| 3,935,795 | 2/1976 | Hawley | 92/39 X |

FOREIGN PATENT DOCUMENTS 935939  9/1963  United Kingdom ......................... 92/97

Primary Examiner—Irwin C. Cohen
Attorney, Agent, or Firm—Candor, Candor & Tassone

[57] ABSTRACT

A diaphragm stack for a control device and having at least two flexible diaphragms separated by a rigid spacer and a pair of rigid outboard members with the pair of outboard members being secured together by a fastening means passing through the center of the stack. The outboard members and the spacer have interlocking means disposed inboard of the inner peripheral portions of the diaphragms and serially interlocking together in the stack to prevent rotation of the spacer and the outboard members relative to each other in their assembled relation in the stack.

16 Claims, 6 Drawing Figures

CONTROL DEVICE DIAPHRAGM STACK AND METHOD OF MAKING THE SAME

BACKGROUND OF THE INVENTION

1. Field of the Invention

This invention relates to an improved diaphragm stack for a control device or the like as well as to a method of making such a diaphragm stack or the like.

2. Prior Art Statement

It is known to provide a diaphragm stack for a control device wherein the diaphgram stack has at least two flexible diaphragms separated by a rigid spacer means and a pair of rigid outboard members that are secured together by a fastening means passing through the center of the stack.

For example, see British Patent to Hood No. 935,939.

SUMMARY OF THE INVENTION

It is a feature of this invention to provide a diaphragm stack wherein rotation of the parts in the stack relative to each other is prevented.

For example, it was found according to the teachings of this invention, that the parts for a diaphragm stack could be formed in a unique manner so that as the parts are serially disposed in the stack, the same interlock in a unique manner so that when the assembly of the stack is completed, the center fastening means thereof can be tightened without having the various parts rotate relative to each other during such securing operation whereby the peripheral openings in the diaphragms of the stack will remain in true alignment with each other.

It was further found according to the teachings of this invention that such interlocking means can be formed in such a manner that the various parts can be disposed in the diaphragm stack in any facing relation therein and still interlock in the manner previously described.

Also, it was found according to the teachings of this invention that a minimum number of parts of this invention can be utilized to provide many different diaphragm stack arrangements as will be apparent hereinafter.

Accordingly, one embodiment of this invention provides a diaphragm stack for a control device and having at least two flexible diaphragms separated by a rigid spacer means and a pair of rigid outboard members with the pair of outboard members being secured together by a fastening means passing through the center of the stack, the diaphragms having inner peripheral portions thereof clamped together in the stack by the members and the spacer means. The members and spacer means have interlocking means disposed inboard of the inner peripheral portions of the diaphragms and serially interlocking together in the stack in a manner that prevents rotation of the spacer means and the members relative to each other in their assembled relation in the stack.

Accordingly, it is an object of this invention to provide an improved diaphragm stack for a control device or the like, the diaphragm stack of this invention having one or more of the novel features of this invention as set forth above or hereinafter shown or described.

Another object of this invention is to provide a method of making such a diaphragm stack or the like, the method of this invention having one or more of the novel features of this invention as set forth above or hereinafter shown or described.

Another object of this invention is to provide an improved control device utilizing such a diaphragm stack or the like, the control device of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF PREFERRED EMBODIMENTS

Figure 1:
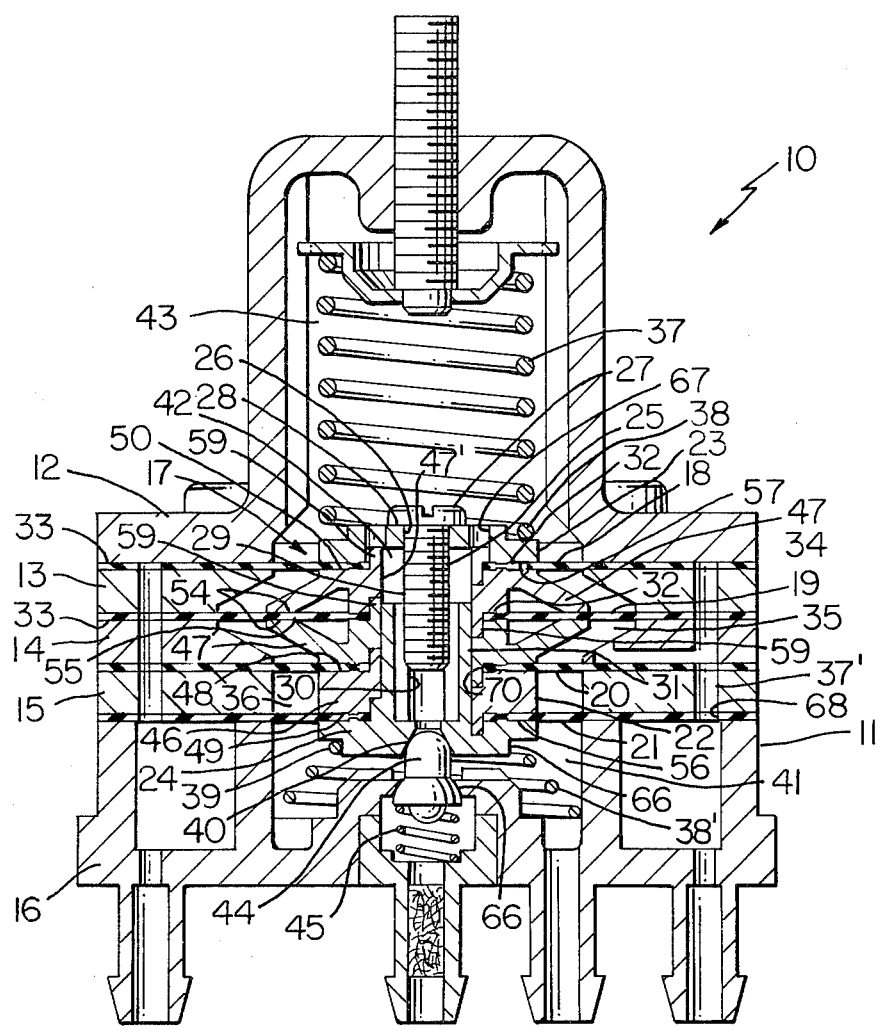
FIG. 1 is a cross-sectional view illustrating one embodiment of a diaphragm stack of this invention utilized in a control device of this invention.

While the various features of this invention are hereinafter described and illustrated as being particularly adapted to provide a diaphragm stack for a certain type of control device, it is to be understood that the various features of this invention can be utilized singly or in any combination thereof to provide a diaphragm stack for other types of control devices as desired.

Therefore, this invention is not to be limited to only the embodiments illustrated in the drawings, because the drawings are merely utilized to illustrate one of the wide variety of uses of this invention.

Referring now to FIG. 1, an improved control device of this invention is generally indicated by the reference number 10 and comprises a housing means 11 formed from a plurality of housing parts 12, 13, 14, 15 and 16 suitably secured in the stacked assembled relation illustrated in FIG. 1 and carrying a diaphragm stack of this invention therein that is generally indicated by the reference numeral 17.

The diaphragm stack 17 of this invention includes a plurality of flexible diaphragms 18, 19, 20 and 21 separated from each other by rigid spacer means 22 of this invention and held together in the stacked relation illustrated in FIG. 1 by a pair of rigid outboard members 23 and 24 secured together by a threaded fastening member 25 passing through a central opening 26 in the outboard member 23 so that an enlarged head 27 thereof will abut against the outside surface 28 of the outboard member 23 while the threaded shank 29 of the threaded fastening member 25 can be threadedly received in an opening means 30 provided in a stem part 31 of the outboard member 24.

In this manner, the inner peripheries 32 of the flexible diaphragms 18–21 are held in clamped relation between the rigid spacer means 22 and rigid outboard members 23 and 24 so that the stack 17 can move in unison in the housing means 11 as the outer peripheral portions 33 of the flexible diaphragms 18-21 are held between the stacked housing members 12-16 as illustrated and as is conventional in the art.

Thus, the flexible diaphragms 18-21 define a plurality of control chambers 34, 35 and 36 in the housing means 11 adapted to receive fluid through suitable portion 37' formed in the housing means 11 and diaphragm members 18-21 in a manner well known in the art to cause the diaphragm stack 17 to move in the housing means 11 in response to various pressures or vacuum conditions existing in the various control chambers 34-36 in a manner well known in the art and thereby cause the control device 10 to perform a control function as is well known in the art.

In the particular control device 10 illustrated in FIG. 1, a first compression spring 37 has one end 38 bearing on the rigid outboard member 23 to tend to urge the diaphragm stack 17 downwardly in opposition to the force of a second compression spring 38' disposed in the control device 10 and having one end 39 bearing against the other outboard member 24 as illustrated.

The outboard member 24 of the diaphragm stack 17 has a frusto-conical valve seat 40 passing centrally therethrough and adapted to interconnect a lower chamber 41 of the control device 10 through the central passage 42 passing through the diaphragm stack 17 to the upper chamber 43 of the control device 10 when the valve seat 40 is moved away from a movable valve member 44 urged upwardly in the drawings by a compression spring 45 and restrained from following the upward movement of the diaphragm stack 17 by another valve seat 46 of the housing means 11 in a manner well known in the art.

Therefore, it can be seen that the control device 10 is adapted to interconnect or vent the chamber 41 of the control device 10 to the chamber 43 when the pressure differential acting across the diaphragm stack 17 causes the diaphragm stack 17 to move upwardly relative to the valve member 44 to open the valve seat 40 and is adapted to interconnect or vent the chamber 41 through the valve seat 46 when the pressure differential acting across the diaphragm stack 17 causes the stack 17 to move downwardly to close the valve seat 40 against the valve member 44 and open the valve member 44 away from the valve seat 46 in a manner well known in the art.

However, the particular details of the control device 10 do not form a part of this invention as the various features of this invention are directed to the uniquely formed diaphragm stack 17 as now to be described.

The rigid spacer means 22 of the diaphragm stack 17 comprise two different types of spacer means, namely, a cylindrical type rigid spacer means 46 and a disc type rigid spacer means 47.

The cylindrical type rigid spacer means 46 has a pair of opposed flat annular faces 48 and 49 to respectively clamp against inner peripheral portions 32 of the flexible diaphragms whereas each disc type rigid spacer means 47 has different sized annular flat diaphragm clamping surfaces 50 and 51 on the respective sides 52 and 53 thereof as illustrated.

In addition, each rigid disc type spacer means 47 has another flat annular diaphragm clamping surface 54 on the side 53 thereof and concentrically disposed about the inner annular clamping surface 51 thereof so as to clamp against a diaphragm at a point radially outwardly from the clamping surface 51 thereof.

For example, as illustrated in FIG. 1, the two rigid disc type spacer means 47 have the clamping surfaces 54 thereof clamping against an intermediate portion 55 of the flexible diaphragm 19 to thereby reduce the effective areas of the diaphragm 19 in a manner well known in the art.

However, the clamping surface 50 of the disc type spacer means 47 is adapted to cooperate with the clamping surface 48 or 49 of a cylindrical type spacer means 46 to hold the diaphragm radially inwardly as illustrated by the clamped diaphragm 20 in FIG. 1.

Similarly, the outboard rigid member 24 has a flat annular diaphragm clamping surface 56 adapted to cooperate with either surface 48 or 49 of a cylindrical type spacer means 46 or with the flat surface 50 or 51 of a rigid spacer means 47 if desired to clamp a diaphragm therebetween. However, as illustrated in FIG. 1, the outboard member 24 has its clamping surface 56 cooperating with the clamping surface 49 of the cylindrical type spacer means 46 to secure the diaphragm 21 in the stack 17.

The rigid outboard member 23 has a flat annular diaphragm clamping surface 57 that can cooperate with the clamping surface 50 or 51 of a disc type spacer means 47 or one of the clamping surfaces 48 or 59 of a cylindrical type spacer 46 if desired. However, in the embodiment illustrated in FIG. 1, the clamping surface 47 of the outboard rigid member 23 cooperates with the clamping surface 50 of the disc type spacer 47 to clamp the inner peripheral portion 32 of the diaphragm 18 therebetween to form the diaphragm stack 17.

As previously stated, the parts 23, 24, 46 and 47 of the diaphragm stack 17 are so constructed and arranged according to the teachings of this invention that the same are adapted to interlock with each other as the diaphragm stack 17 is being serially assembled so that the parts 23, 24, 46 and 47 cannot rotate relative to each other in their assembled condition.

This feature is accomplished by having each part 23, 24, 46 and 47 provided with like interlocking means that are generally indicated by the reference numeral 58 in the drawings and each comprises a circular array of spaced tongues 59 defining similarly shaped spaces 60 therebetween, the circular array of tongues 59 of each interlocking means 58 be concentric with the longitudinal axis passing through the center of the particular part 23, 24, 46 or 47 as illustrated.

While the interlocking means 58 for the parts 23 and 24 respectively extend from the sides 61 and 62 thereof, the interlocking means 58 for the spacers 47 extend from both sides 52 and 53 thereof and the interlocking means 58 for the spacers 46 extend from the opposed sides 63 and 64 thereof, whereby it makes no difference which side of a particular spacer 46 or 47 is facing in which direction in a diaphragm stack between the outboard members 23 and 24 as will be apparent hereinafter as the same will properly interlock with a part 23, 24, 46 or 47 disposed adjacent thereto in the same manner in a manner hereinafter described.

Figure 6:
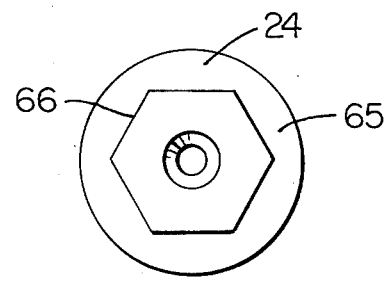
FIG. 6 is a bottom view of the stem member of FIG. 4 and is taken in the direction of the arrows 6—6 of FIG. 4.

In order to permit restraining movement of the outboard member 24 during the tightening of the fastening means 25 in a manner hereinafter described, the side 65 of the outboard member 24 can be provided with a hex projection 66 as illustrated in FIG. 6 to permit a socket wrench or the like to grip the hex section 66 to prevent rotation of the member 24 during the tightening of the fastening member 25 in a manner hereinafter described.

The outboard member 23 can be provided with a plurality of openings 67 passing therethrough in offset relation to the central opening 26 thereof so as to interconnect the central passage 42 of the stack 17 to the exterior thereof, the opening 26 being concentric with the longitudinal axis of the part 23 as well as with the longitudinal axis of the stem part 31 of the outboard member 24 so as to permit the fastening member 25 to be threaded into the opening 30 of the stem 31 to be secured thereto in a manner hereinafter set forth.

Figure 5:
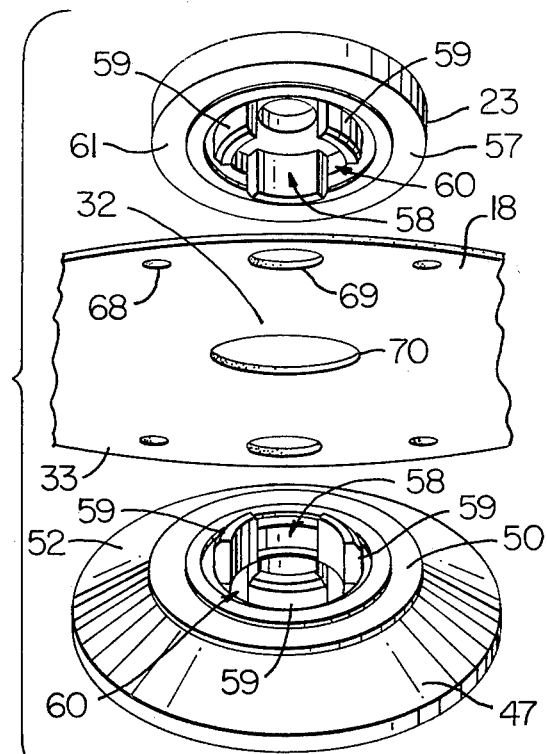
FIG. 5 is an exploded perspective view illustrating two of the parts of the diaphragm stack of FIG. 4 with a flexible diaphragm that is to be secured therebetween.

As previously stated, each diaphragm 18-21 has a plurality of openings formed therethrough to permit conventional internal porting through the control device 11, such openings being illustrated by the reference numerals 68 and 69 in FIG. 5 for the diaphragm 18. Also, each diaphragm 18-21 has a central opening 70 passing therethrough which defines the inner peripheral part 32 thereof with each opening 70 being adapted to readily accept the circular array of interlocking tongues 59 therethrough in the manner illustrated in FIG. 1.

From the above, it can be seen that the various parts 23, 24, 46 and 47 for the diaphragm stacks 17 of this invention can be formed in a relatively simple manner from any suitable material, such as plastic materials, metallic materials, etc., to form the diaphragm stack 17 by the method of this invention in a manner now to be described.

Assuming that the assembler desires to build the diaphragm stack 17 upwardly from the outboard member 24, the first diaphragm 21 is inserted over the stem 31 in a manner to receive the stem 31 through the central opening 70 thereof and permit the tongues 59 of the outboard member 24 to project through the opening 70 of the diaphragm 21. Thereafter, the rigid spacer 46 is assembled down over the stem 31 by receiving the stem 31 in the central opening 46' thereof and having the tongues 59 of the spacer 46 that are projecting toward the diaphragm 21 projected into the spaces 60 between the tongues 59 on the outboard member 24 while the tongues 59 on the outboard member 24 are likewise being received in the cooperating spaces 60 of the spacer 46 so that the tongues 59 intermesh and lock together and the diaphragm 21 has its inner peripheral portion 32 received between the cooperating annular clamping surface 56 of the outboard member 24 and the particular clamping surface 48 or 49 of the member 46 depending upon which side 63 or 64 of the spacer 46 is facing toward the clamping surface 56 of the outboard member 24. Such interlocking of the interlocking means 58 of the members 24 and spacer 46 not only prevent rotational movement between the members 46 and 24, but also such interlocking relation automatically coaxially aligns the members 24 and 46 together.

Subsequently, the next diaphragm 20 is telescoped onto the stem 31 and the upwardly projecting tongues 59 of the member 46 by having the stem 31 and upwardly projecting tongues 59 telescoped through the opening 70 of the diaphragm 20 to thereafter permit the spacer 47 to have its side 52 facing downwardly and telescopically receive the stem 31 through the central opening 47' thereof, downwardly facing tongues 59 of the spacer 47 meshing with the interlocking means 58 of the spacer 46 to not only interlock the members 46 and 47 together as previously set forth, but also to coaxially align the same as illustrated in FIG. 1.

Thereafter, the diaphragm 19 is assembled to the lower spacer 47 as previously set forth and the upper spacer 47 is then assembled thereto to clamp the diaphragm 19 therebetween, the side 53 of the upper spacer 47 facing downwardly so that the outer clamping portions 54 of the spacers 47 will clamp the intermediate portion 55 of the diaphragm 19 therebetween as illustrated in FIG. 1.

It can be seen that the length of the stem 31 is such that the same does not project into the opening 47' of the upper spacer 47 but because of the serial interlocking relation between the interlocking means 58 of the spacers 47, the stem 31 of the outboard member 24 is not needed to coaxially align or carry the upper spacer 47 as will be apparent hereinafter.

Subsequently, the diaphragm 18 is assembled onto the interlocking tongues 59 of the upper spacer 47 to permit the other outboard member 23 to have its interlocking means 58 interlock with the upwardly projecting interlocking means 58 of the upper spacer 47 as illustrated in FIG. 1 to also be coaxially aligned therewith and interlocked thereto so that rotational movement therebetween cannot be effected.

Thereafter, the fastening member 25 is inserted through the opening 26 of the outboard member 23 so as to have its threaded shank 29 received into the opening 30 of stem 31 and be threaded downwardly therein to pull the outboard members 23 and 24 toward each other and thereby clamp the diaphragms 18-21 and members 23, 47, 46 and 24 together.

During such tightening of the fastening means 25, if the parts 23, 24, 46 and 47 were not held from rotating relative to each other through the interlocking means 58 of this invention in the manner previously described, not only would the parts 23, 24, 46 and 47 rotate relative to each other, but the diaphragms 18-21 would likewise rotate therewith and have the openings 68 and 69 disposed in an out of alignment with each other so that the same would not cooperate with the housing members 12-16 to provide the porting 37' previously described unless the diaphragms 18-21 were realigned into their initial assembled condition.

However, during the tightening of the fastening means 25 of this invention, the hex portion 66 of the outboard member 24 is restrained from movement so that the entire stack 17 of parts 23, 24, 46 and 47 and diaphragms 18-21 will not move relative to each other even though the fastening member 25 is being rotated to tighten its threaded relation with the stem 31 of the outboard member 24 in the manner previously described whereby the diaphragms 18-21 maintain their desired alignment of the openings 68 and 69 thereof that was selected when the diaphragms 18-21 were being assembled into the stack 17.

Thus, it can be seen that it is a relatively simple method of this invention to make the diaphragm stack 17 of this invention as the stack 17 can be assembled in a relatively simple and quick manner to interlock the various parts together which will automatically coaxially align themselves regardless of which side of which part is facing against which side of an adjacent part thereof and regardless of how many of such parts or different parts are disposed in the stack thereof.

Figures 2, 3:
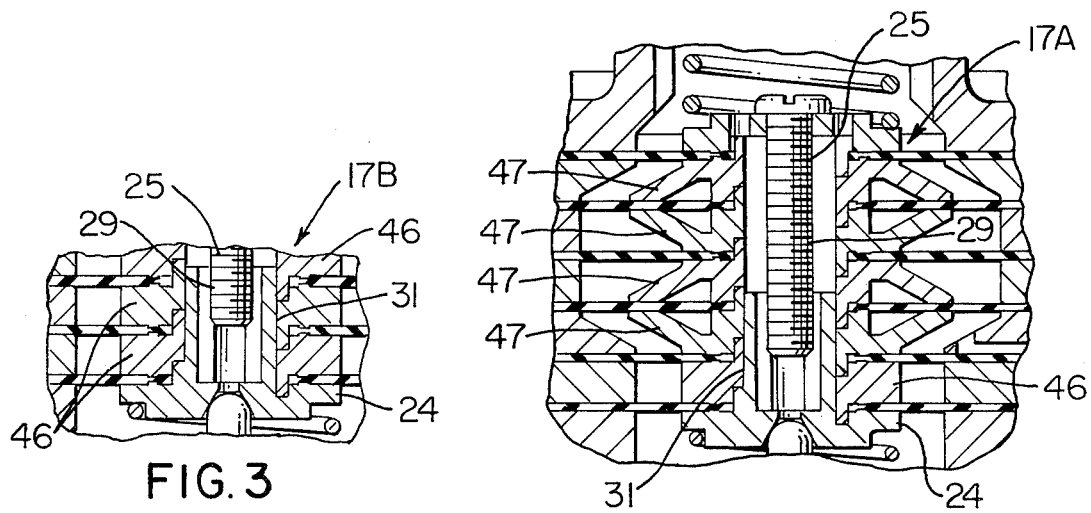
FIG. 2 is a fragmentary view similar to FIG. 1 and illustrates another embodiment of the diaphragm stack of this invention.
FIG. 3 is a view similar to FIG. 2 and illustrates still another embodiment of the diaphragm stack of this invention.
Figure 4:
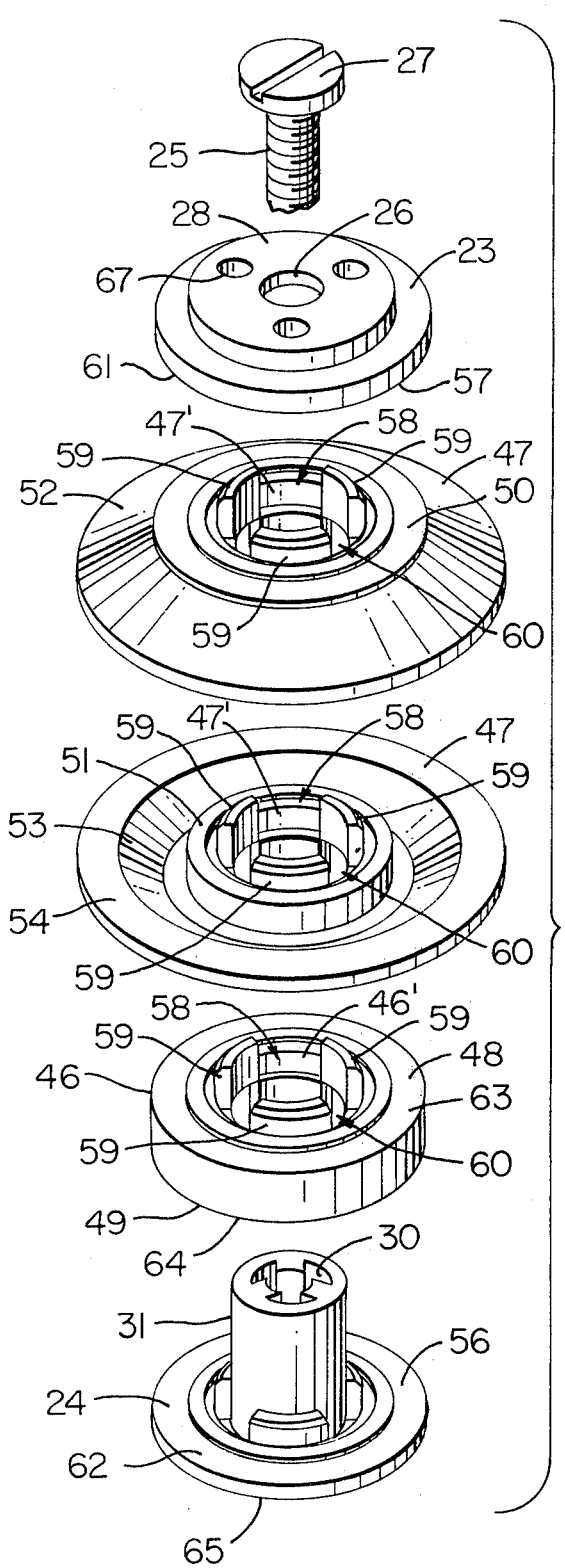
FIG. 4 is an exploded perspective view illustrating various parts of the diaphragm stack of FIG. 1.

For example, reference is made to FIG. 2 wherein it can be seen that more than two cooperating disc type parts 47 are utilized in the diaphragm stack 17A thereof and it can be seen in FIG. 3 that more than a single cylindrical type spacer 46 is utilized in forming the diaphragm stack 17B thereof.

The only difference between the diaphragm stack 17 and the diaphragm stacks 17A and 17B is in the length of the fastening means 25 as the outboard part 24 is exactly the same for the diaphragm stacks 17, 17A and 17B as there is no necessity for the stem 31 to extend throughout the entire length of the particular diaphragm stack because the parts themselves can be built-up to any length and it is only necessary that the shank portion 29 of the fastening means 25 can extend between the outboard parts 23 and 24 thereof to secure the particular length diaphragm stack together.

Thus, it can be seen that not only does the spacer means 46 and 47 of this invention permit any length diaphragm stack to be formed therefrom while still interlocking together to prevent rotational movement therebetween, but also the parts 46 and 47 are so constructed and arranged that any desired side thereof can face in any desired direction in the stack and still cooperate with an adjacent and any type spacer or outboard member 23 or 24 to clamp a diaphragm therebetween.

Accordingly, it can be seen that this invention not only provides an improved diaphragm stack and method of making the same, but also this invention provides an improved control device by utilizing such a diaphragm stack or the like.

While the forms and methods of this invention now preferred, have been illustrated and described as required by the Patent Statute, it is to be understood that other forms and method steps can be utilized and still fall within the scope of the appended claims.

What is claimed is:

1. In a diaphragm stack for a control device and having at least two flexible diaphragms separated by a rigid spacer means and a pair of rigid outboard members with said pair of outboard members being scured together by a fastening means passing through the center of said stack, said members and said spacer means having interlocking means interlocking together in said stack in a manner that prevents rotation of said spacer means and said members relative to each other in their assembled relation in said stack, the improvement wherein said interlocking means for each said member and said spacer means comprises a plurality of spaced tongues disposed in a circular array and a plurality of spaces respectively disposed between said tongues whereby each said member and said spacer means receives said tongues of its adjacent member or spacer means in said spaces thereof and disposes its tongues in said spaces of its respective adjacent member or spacer means.

2. A diaphragm stack as set forth in claim 1 wherein said interlocking means center said members and said spacer means along a common centerline in said stack as said interlocking means interlock together.

3. A diaphragm stack as set forth in claim 1 wherein said spacer means has said circular array of spaced tongues and spaces on each side thereof.

4. A diaphragm stack as set forth in claim 3 wherein said stack includes a plurality of pairs of said flexible diaphragms and a plurality of said spacer means with each pair of adjacent flexible diaphragms being separated by a spacer means.

5. A diaphragm stack as set forth in claim 4 wherein at least two of said spacer means comprise a pair of like discs clamping one of said flexible diaphragms therebetween.

6. A diaphragm stack as set forth in claim 1 wherein said spacer means has a center opening passing therethrough, one of said members having a stem disposed in said opening of said spacer means and the other of said members carrying said fastening means, said stem being secured to said fastening means.

7. A diaphragm stack as set forth in claim 6 wherein said stack includes a plurality of pairs of said flexible diaphragms and a plurality of said spacer means with each pair of adjacent flexible diaphragms being separated by a spacer means, said stem being disposed in only the aligned center openings of certain of said spacer means disposed adjacent said one member, said fastening means passing through said aligned center openings of the remainder of said spacer means from said other member to said stem.

8. A diaphragm stack as set forth in claim 1 wherein each said member and said spacer means has said interlocking means thereof integral therewith so as to be one-piece therewith.

9. In a method of making a diaphragm stack for a control device and having at least two flexible diaphragms separated by a rigid spacer means and a pair of rigid outboard members with said pair of outboard members being secured together by a fastening means passing through the center of said stack, said members and said spacer means having interlocking means that interlock together in said stack and thereby prevent rotation of said spacer means and said members relative to each other in their assembled relation in said stack, the improvement comprising the step of forming said interlocking means for each said member and said spacer means to comprise a plurality of spaced tongues disposed in a circular array and a plurality of spaces respectively disposed between said tongues whereby each said member and said spacer means receives said tongues of its adjacent member or spacer means in said spaces thereof and disposes its tongues in said spaces of its respective adjacent member or spacer means.

10. A method of making a diaphragm stack as set forth in claim 9 and including the step of forming said interlocking means to center said members and said spacer means along a common centerline in said stack as said interlocking means interlock together.

11. A method of making a diaphragm stack as set forth in claim 9 and including the step of forming said spacer means to have said circular array of spaced tongues and spaces on each side thereof.

12. A method of making a diaphragm stack as set forth in claim 11 and including the step of forming said stack to include a plurality of pairs of said flexible diaphragms and a plurality of said spacer means with each pair of adjacent flexible diaphragms being separated by a spacer means.

13. A method of making a diaphragm stack as set forth in claim 12 and including the step of forming at least two of said spacer means to comprise a pair of like discs clamping one of said flexible diaphragms therebetween.

14. A method of making a diaphragm stack as set forth in claim 9 and including the steps of forming said spacer means to have a center opening passing therethrough, forming one of said members to have a stem disposed in said opening of said spacer means, causing the other of said members to carry said fastening means, and securing said stem to said fastening means.

15. A method of making a diaphragm stack as set forth in claim 14 and including the steps of forming said stack to include a plurality of pairs of said flexible diaphragms and a plurality of said spacer means with each pair of adjacent flexible diaphragms being separated by a spacer means, disposing said stem in only the aligned center openings of certain of said spacer means disposed adjacent said one member, and causing said fastening means to pass through said aligned center openings of the remainder of said spacer means from said other member to said stem.

16. A method of making a diaphragm stack is set forth in claim 9 wherein said step of forming said interlocking means for each said member and said spacer means comprises the step of forming said interlocking means for its respective member or spacer means integral therewith so as to be one-piece therewith.

* * * * *